Oct. 20, 1959   E. HANDLER   2,908,997
MUSICAL TOY VEHICLE
Filed April 4, 1955   2 Sheets-Sheet 1
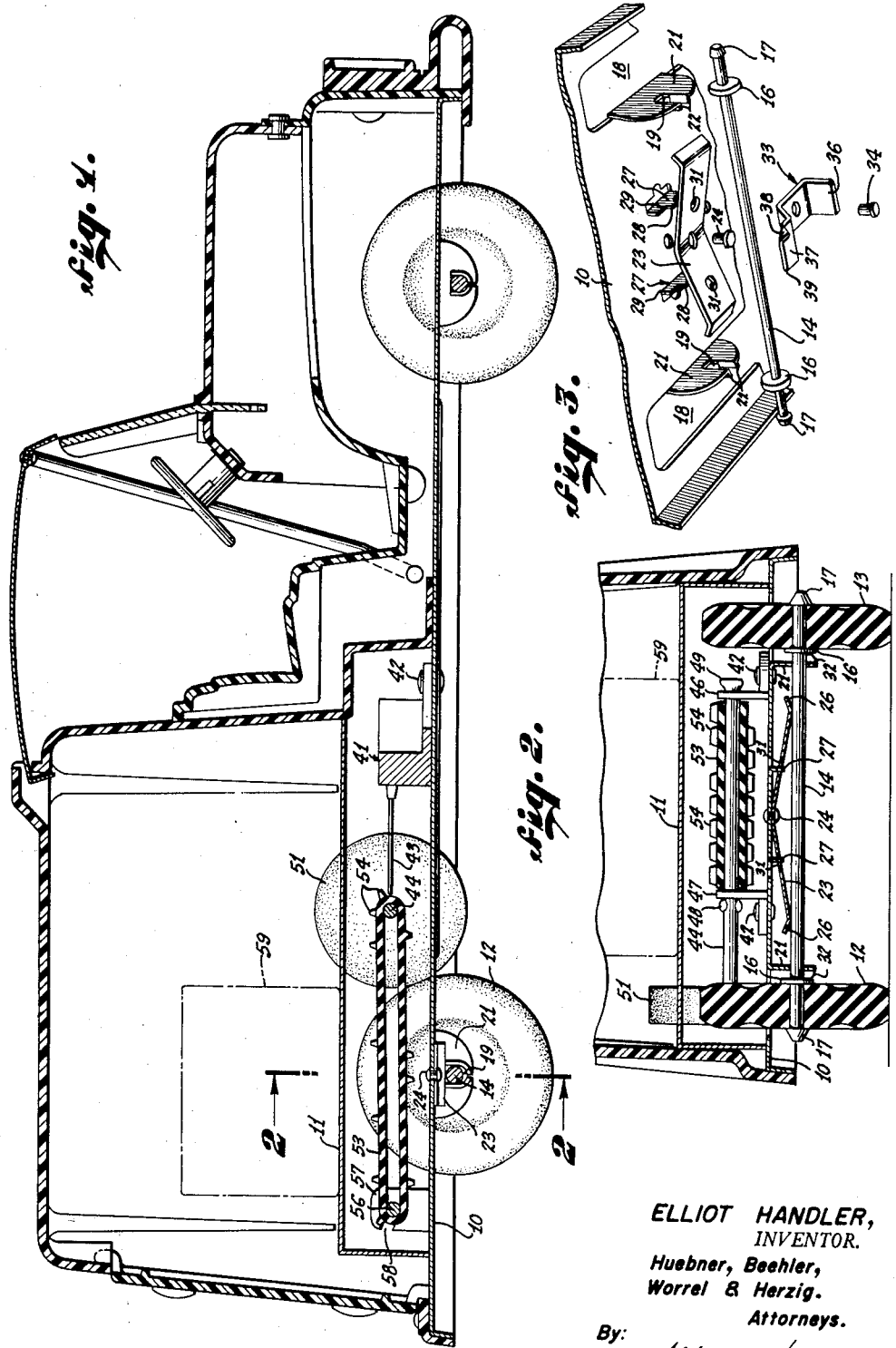
ELLIOT HANDLER,
INVENTOR.
Huebner, Beehler,
Worrel & Herzig.
Attorneys.
By:

Oct. 20, 1959
E. HANDLER
2,908,997
MUSICAL TOY VEHICLE
Filed April 4, 1955
2 Sheets-Sheet 2
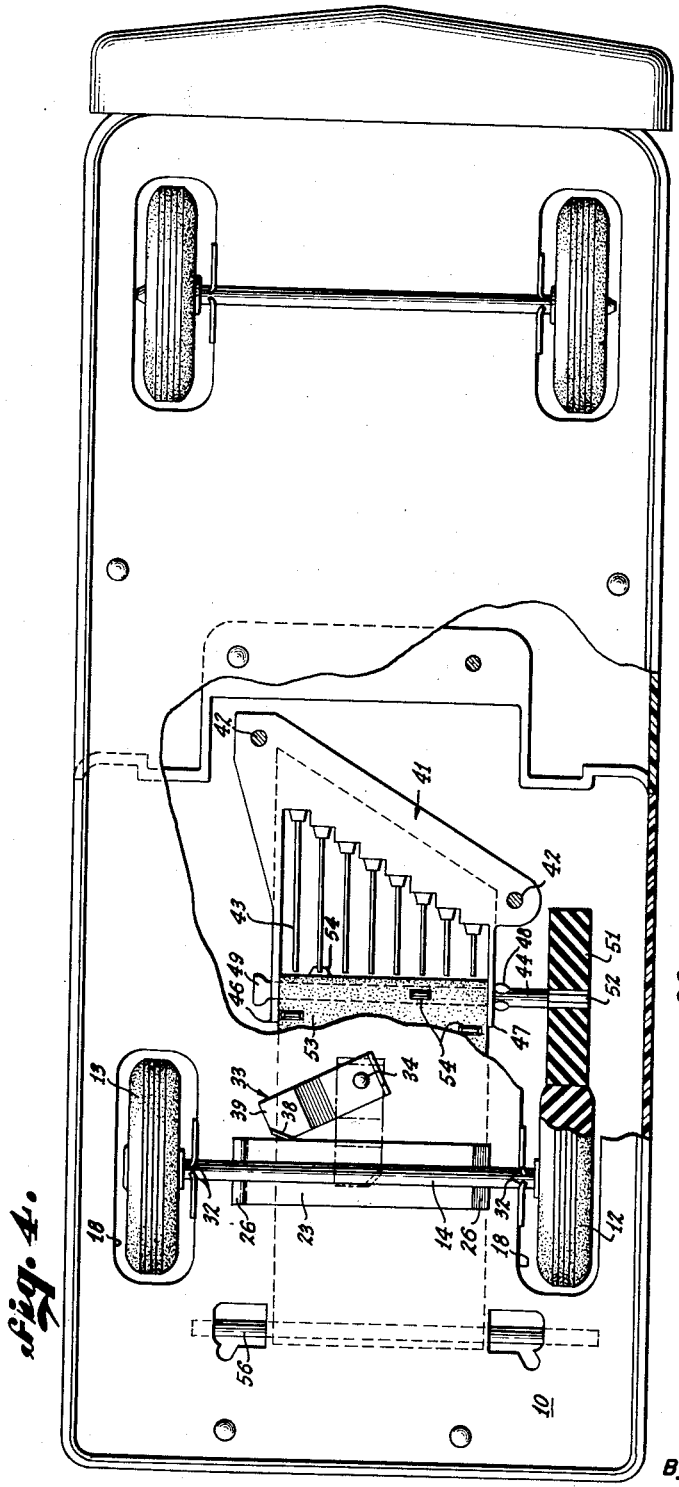
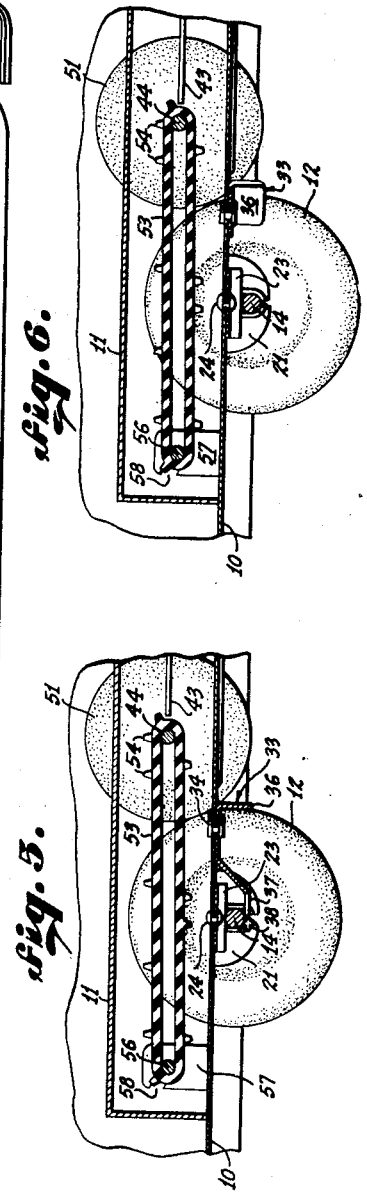
ELLIOT HANDLER,
INVENTOR.
Huebner, Beehler,
Worrel & Herzig.
Attorneys.
By:

2,908,997
MUSICAL TOY VEHICLE

Elliot Handler, Los Angeles, Calif.

Application April 4, 1955, Serial No. 498,903

5 Claims. (Cl. 46—111)

The present invention relates to a musical instrument actuating mechanism for a toy vehicle simulating an actual, full size vehicle, and in particular to an adjustable actuating mechanism capable of being set for actuating the musical instrument continuously with movement of the toy vehicle, or only when pressure is applied to the wheels of the moving toy vehicle.

It is an important object of my invention to provide a musical toy of sturdy construction mounted on wheels and adapted for the production of music by the application of pressure on the wheels of the toy while the wheels are turning.

Another object is to provide a toy vehicle that can be adjusted three ways as follows: (1) to continuously produce music while the vehicle is rolling on its wheels, (2) to roll on its wheels without the production of music, and (3) to produce music while rolling on its wheels only when pressure is applied to the wheels.

A further object is to provide a toy automobile simulating an ice cream vending truck of the type that tours through residential neighborhood streets while playing chimes to attract the attention of children.

Additional objects will become apparent from the following description:

Broadly stated, the vehicle musical mechanism of my invention comprises a musical instrument adapted for actuation by a rotating member of the vehicle, such as a wheel or an axle, power transmission means connecting the rotating member with the musical instrument for actuation thereof, and shifting mechanism for either continuously engaging, continuously disengaging or intermittently engaging the rotating member with the power transmission means for actuating the musical instrument.

A more detailed description of a specific embodiment of the invention, as applied to a toy ice cream vending truck, is given with reference to the drawings, wherein:

Figure 1 is a cross-sectional elevational view showing a toy ice cream vending truck carrying a musical comb actuated by a belt driven by power transmitted from the rear wheels of the truck by a friction wheel;

Figure 2 is a vertical cross-sectional view taken on the line 2—2 of Figure 1;

Figure 3 is a partial exploded view in perspective showing the rear axle, axle mounting brackets and axle shifting mechanism of the truck shown in Figure 1;

Figure 4 is a bottom plan view showing the truck and mechanism of Figure 1;

Figure 5 is a partial vertical cross-sectional view showing the musical instrument actuating mechanism of Figure 1 shifted into continuous engagement with a rear wheel of the truck; and Figure 6 is a similar view showing the actuating mechanism continuously disengaged from a rear wheel of the truck.

In the specific embodiment of the invention shown in the drawings, the body parts, seat, dash, steering wheel, windshield, hood, fenders, grill, top, bumpers and other parts can be made of plastic, metal, or other material, and can be made to resemble in detail a full-scale ice cream vending truck. These parts of the truck are made, assembled and mounted on a bottom plate 10, preferably made of sheet metal. A cover plate 11, preferably also made of sheet metal is suitably mounted on top of bottom plate 10 to serve as the bottom of the truck body and to cover the musical instrument and actuating mechanism.

The front axle and wheel assembly is rotatably mounted on the bottom plate 10 in any suitable manner, as indicated in Figures 1 and 4. The rear wheels 12 and 13 are fixedly mounted on rear axle 14 to rotate therewith. This can be done by any suitable method, such as by brazing a washer 16 on the axle 14 near the end thereof, and brazing the hub of a wheel 12 or 13, which can be a hollow rivet eyelet, to a washer 16. The wheels 12 and 13 are additionally tightened on the axle 14 by forming heads 17 on the ends of the axle tightly against the outside of the wheel hubs.

Suitable openings 18 (Figures 3 and 4) are cut through the bottom plate 10 to accommodate wheels 12 and 13 when the axle 14 is mounted in slots 19 in brackets 21. The brackets 21 can be cut into portions of the cut-out metal of bottom plate 10 obtained in forming openings 18. The cut-out metal portions are trimmed to the desired shape, as best shown in Figure 3, to form the brackets 21.

Slots 19 can be made as follows. A cut is made to extend from the free end of the cut-out metal portion inward the desired distance toward the suspended end of the cut-out portion. A transverse cut is then made at the end of the first-mentioned cut, and perpendicular thereto. Flanges 22 and slots 19 are formed by bending the metal of the flanges downward and at right angles to the plane of bottom plate 10. The brackets 21 are completed by bending the cut-out portion downward along an edge of openings 18 at right angles to the plane of bottom plate 10.

The brackets can be suspended from either the inner edges or the outer edges of openings 18. Instead of making the brackets 21 from cut-out metal portions of openings 18, the brackets can be made from separate pieces of sheet metal cut to shape and provided with slots 19. The resulting brackets 21 can then be fixed at right angles to the bottom of plate 10 by any suitable method such as welding, riveting or bolting. The vertical planes of the brackets 21 can be positioned at either the inner or outer edges of the openings 18, as described above, or to the outside or to the inside of these openings.

Above the axle 14 is positioned a leaf spring 23, preferably made of blued clockspring steel. The spring 23 is fixed to the bottom plate 10 at the mid-point of the spring with a rivet 24, and with the ends 26 of the spring bearing downward on the axle 14. The ends 26 preferably are turned upward somewhat to reduce their friction on the axle 14. Vertical guide posts 27 are cut from the bottom plate 10 to have a guide projection 28 and a stop portion 29. The guide posts 27 are bent downward at right angles to the base plate 10 so that projections 28 extend into holes 31 through the sides of spring 23 and stop portions 29 bear against the back of the spring 23.

It will be seen that the spring 23 normally urges the axle 14 downwardly. To retain the axle 14 in slots 19 against the action of spring 23, flanges 22, of the brackets 21, are slit horizontally near their lower ends and the lower portions 32 of the flanges 22 are bent toward each other to act as stops, as best shown in Figure 4, to retain axle 14 in slots 19. Thus axle 14 can be forced upward through slots 19 against the upper limit thereof, but will normally be urged downward to bear against flanges 32 at the lower limits of the slots 19.

A clip 33 is rotatably mounted forward or rearward of axle 14 on the bottom of bottom plate 10 with a rivet 34. The clip 33 is provided with a downwardly extending finger portion 36 and a downwardly extending clamping portion 37, having a corner 38 thereof turned downwardly. When the clip 33 is rotated out of engagement with axle 14, as shown in Figure 4, spring 23 urges axle 14 to its lower limit, as shown in Figure 6. Axle 14 can be retained in an upward position in slots 19 by forcing the axle upward and turning clip 33 (Figure 4) in a counterclockwise direction to the position shown in phantom. The corner 38 is turned downward to facilitate slippage of the clip 33 under the axle 14. This upward retention of axle 14 is also shown in Figure 5. The axle 14 also can be locked in its lowermost position by slipping clip 33, with its unturned corner 39, above the axle 14 to prevent upward movement of axle 14, even when light pressure is applied to the axle upwardly or to spring 23 downwardly.

In the specific embodiment of the drawings, showing a toy ice cream vending truck, the musical instrument chosen is a musical comb to simulate the chimes of the actual ice cream vending truck. Other musical instruments can, however, be chosen if desired, such as a harp, chimes, or the like. The musical comb consists of a bifurcated tone bar 41 riveted by rivets 42 to the upper side of bottom plate 10. The tone bar 41 carries a set of reeds 43, as best shown in Figure 4, and an axle or crank 44.

The axle 44 is rotatably mounted in prongs 46 and 47 of the tone bar and is prevented from moving axially by staking punches 48 and head 49. On the end of axle 44 extending beyond prong 47 is fixedly mounted a crank or friction wheel 51 to rotate with the axle 44. This can be accomplished by forming a cross 52 on the end of the axle 44, as indicated, or by brazing a hub, such as a hollow rivet eyelet, of the wheel 51 to the axle 44. The wheel 51 is of cylindrical shape and can be made of rubber or other resilient material having a high coefficient of friction.

The dimension of wheel 51 and the position of axle 44 are determined so that when axle 14 is in its lowermost position (Figure 6), the rear wheel 12 will not engage wheel 51, and when the axle 14 is in an elevated position (Figure 5), the periphery of wheel 51 will tightly engage rear wheel 12 at its periphery.

An endless elastic belt 53, made of rubber, or similarly elastic material having a high coefficient of friction, and provided with outwardly extending protuberances 54, is tightly mounted on axle 44, between prongs 46 and 47, and on idler axle 56, between brackets 57. The brackets 57 can be formed from cut-out portions of sheet metal bent upward from bottom plate 10, and vertical thereto, or they can be made of separate pieces of sheet metal and fastened to plate 10 by solder, rivets, bolts, or the like. The brackets 57 are provided with slots 58 extending from the rear edge of the brackets to a middle portion thereof to receive idler axle 56. The brackets serve to rotatably mount idler axle 56 and maintain tension on belt 53 so that translatory motion is produced in the belt as axle 44 is rotated by wheel 51.

The protuberances 54 on moving belt 53 engage and pluck reeds 43 as they pass over axle 44. The spacing and positioning of the protuberances 54 relative to the reeds 43 are chosen so that tunes are played resembling those played by the actual ice cream vending trucks. The bottom plate 10 acts as a resonator for the musical notes emitted from the vibrating reeds 43 and improves the quality of the music.

In view of the description given above, it will be seen that when clip 33 is disengaged from axle 14, as shown in Figure 4, the rear wheel 12 will not be engaged by the friction wheel 51, as shown in Figure 6, and power to drive the belt 53 and play the musical comb will not be transmitted from the rear wheels 12 and 13 to the musical instrument actuating mechanism. However, the belt 53 of the musical instrument actuating mechanism can be actuated by applying a downward force to the body of the truck so that axle 14 floats upward in slots 19 sufficiently to cause rear wheel 12 to engage friction wheel 51. A weight 59, shown in phantom in Figure 1, can be loaded into the truck body for this purpose, or the truck body can be forced downward periodically to play the musical comb only during such periods. When the corner 39 of clip 33 is forced above axle 14 to lock the axle in its downward position, the friction wheel 51 is disengaged from the rear wheel 12 even if light pressure or a load 59 are applied to the truck body and the truck rolls along quietly without playing the musical comb. When the clip 33 is set under the axle 14 to lock the axle in its elevated position, as shown in Figures 1 and 5, the friction wheel 51 engages the rear wheel 12 and transmits power from the rear wheels of the truck to the belt 53 to drive the belt and to play the reeds 43.

The varied settings of clip 33, and the general design of the shifting mechanism and musical instrument actuating mechanism impart versatility and an air of mystery to the toy vehicle thus enhancing its value and attractiveness as a toy.

Although the toy vehicle music mechanism has been described and shown in the drawings as applied to a toy ice cream vending truck, it will be understood that the foregoing description and illustrations are given primarily for explanatory purposes to illustrate and describe a specific embodiment of my invention. The musical mechanism of the invention can similarly be mounted in other toy vehicles of a wide variety of design and types such as toy circus vehicles, toy vending vehicles in general, and Christmas toys in general. Instead of transmitting power from a rear wheel of the vehicle, it can be transmitted from a front wheel, or from any rotating member of the vehicle, to the musical instrument actuating mechanism.

It is recognized that many variations in the structure, design and details of the toy vehicle music mechanism described and shown above will occur to one skilled in the art. Accordingly, it is understood that such changes and modifications in the structure, design and details of the specific embodiment of my invention illustrated and described above may be made within the scope of the appended claims without departing from the spirit of the invention.

What I claim is:

1. A musical toy vehicle, comprising: a vehicle body; a wheel and axle assembly including at least one ground-engaging wheel, said axle being mounted in spaced, generally vertical slots in said vehicle body for limited vertical movement with respect thereto; a spring mounted on said body and positioned between said body and said axle and urging said body upwardly with respect to said axle; and a music-producing device fixedly mounted on said body and having a rotary drive member positioned adjacent one wheel of said assembly and in overlapping relation thereto, said rotary drive member being moveable downwardly with said body into frictional driving engagement with said one wheel and being moveable upwardly with said body out of driving engagement with said one wheel, said spring normally holding said body in its uppermost position relative to said assembly with said drive member out of engagement with said one wheel.

2. The device of claim 1 wherein said vehicle includes a bottom plate and said music-producing device is fixedly secured thereabove whereby said bottom plate acts as a resonator.

3. A toy vehicle as defined in claim 1 including a latch element movably mounted on said body, said element being selectively movable to a position between said body and axle to hold said body in its upper position independently of said spring, to a position below said axle to hold said body in its lower position against the action of said spring, or to a position free of said axle wherein said body is yieldably supported on said spring.

4. A musical toy truck comprising a musical comb mounted on the truck, a vehicle axle mounted for restricted linear movement in slot means on the truck, a vehicle wheel rotatably mounted on the vehicle axle, a friction wheel rotatably mounted adjacent the vehicle wheel, a leaf spring mounted adjacent the vehicle axle and urging the axle and the vehicle wheel out of engagement with the friction wheel, a clip rotatably mounted adjacent the vehicle axle and having means adapted to engage said axle for retaining the axle in position against the spring for operative engagement of the friction wheel with the vehicle wheel in one setting and said friction wheel being disengaged from the vehicle wheel when the clip is moved out of engagement with said axle, an endless belt moveably mounted on an axle attached to the friction wheel, and protuberances fixed on the belt in spaced relationship for plucking the reeds of the musical comb for the production of music therefrom upon movement of said belt.

5. A musical toy vehicle, comprising: a vehicle body; a wheel and axle assembly including at least one ground-engaging wheel, said axle being mounted in spaced, generally vertical slots in said vehicle body for limited vertical movement with respect thereto; a spring mounted on said body and positioned between said body and said axle and urging said body upwardly with respect to said axle; and a music-producing device fixedly mounted on said body and having a rotary drive member positioned adjacent one wheel of said assembly and in overlapping relation thereto, said rotary drive member being moveable downwardly with said body into driving engagement with means fixed on said axle and being moveable upwardly with said body out of driving engagement with said means, said spring normally holding said body in its uppermost position relative to said assembly with said drive member out of engagement with said one wheel.

References Cited in the file of this patent

UNITED STATES PATENTS

| | | |
|---|---|---|
| 569,158 | Arnold | Oct. 13, 1896 |
| 619,543 | Cady | Feb. 14, 1899 |
| 1,537,822 | Hayes | May 12, 1925 |
| 1,566,762 | Miles | Dec. 22, 1925 |
| 1,578,022 | Florkey | Mar. 23, 1926 |
| 2,609,640 | Newell et al. | Sept. 9, 1952 |
| 2,630,655 | Duncan | Mar. 10, 1953 |
| 2,677,216 | Hein | May 4, 1954 |
| 2,697,299 | Sebel | Dec. 21, 1954 |